US008189207B2

(12) United States Patent
Kobashigawa

(10) Patent No.: US 8,189,207 B2
(45) Date of Patent: May 29, 2012

(54) APPARATUS AND METHOD FOR SINGLE COLOR OR COLOR PRINTING

(75) Inventor: Kei Kobashigawa, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1240 days.

(21) Appl. No.: 11/934,904

(22) Filed: Nov. 5, 2007

(65) Prior Publication Data

US 2008/0106751 A1 May 8, 2008

Related U.S. Application Data

(60) Provisional application No. 60/864,695, filed on Nov. 7, 2006.

(30) Foreign Application Priority Data

Jul. 3, 2007 (JP) ................................ 2007-175494

(51) Int. Cl.
*G06F 3/12* (2006.01)
*G06K 15/00* (2006.01)

(52) U.S. Cl. ......... 358/1.13; 358/1.14; 358/1.9; 399/24; 399/27; 399/29; 399/30; 399/85

(58) Field of Classification Search .................. 358/1.9, 358/1.13, 1.15; 399/24, 43, 27, 29, 30, 85
See application file for complete search history.

(56) References Cited

U.S. PATENT DOCUMENTS 5,636,032 A * 6/1997 Springett ..................... 358/296
5,751,434 A * 5/1998 Narendranath et al. ....... 358/1.9
6,029,023 A * 2/2000 Munemori et al. ............. 399/66
6,084,554 A * 7/2000 Hirose et al. ...................... 345/5
6,788,907 B1 * 9/2004 Burkes et al. .................. 399/82
6,865,355 B2 * 3/2005 Burkes et al. .................. 399/85
6,991,319 B2 * 1/2006 Zerza et al. ..................... 347/43
7,365,865 B2 * 4/2008 Kidani et al. ................ 358/1.13
7,664,420 B2 * 2/2010 Oominami et al. ............. 399/85
7,676,171 B2 * 3/2010 Swantner et al. ............... 399/85
7,889,372 B2 * 2/2011 Iwasaki ........................ 358/1.15
2001/0024301 A1 * 9/2001 Kohri ............................ 358/500
2003/0164971 A1 * 9/2003 Kidani et al. ................ 358/1.13
2004/0075855 A1 * 4/2004 Tyson et al. .................. 358/1.13

FOREIGN PATENT DOCUMENTS

JP 2004-151462 5/2004
JP 2005-035133 2/2005

* cited by examiner

*Primary Examiner* — Twyler Haskins
*Assistant Examiner* — Dennis Dicker
(74) *Attorney, Agent, or Firm* — Turocy & Watson, LLP

(57) ABSTRACT

A color image forming apparatus that automatically switches a printing mode between a single color printing mode and a color printing mode according to requested image data stores, when capturing of image data of a print job is started, the image data in an image memory unit, starts image formation of the image data in the color printing mode as an initial state, and maintains a color printing mode regardless of the image data until the number of printed copies reach a first number of copies for operation switching determination X1. When the number of printed copies reaches X1, the color image forming apparatus compares, in a comparing unit, the number of remaining pages of the print job and a second number of copies for operation switching determination X2 stored in a number-of-pages storing unit 36 and controls the printing mode on the basis of a result of the comparison and information concerning whether the remaining image data is color image data or single color image data.

6 Claims, 6 Drawing Sheets

APPARATUS AND METHOD FOR SINGLE COLOR OR COLOR PRINTING

BACKGROUND OF THE INVENTION

1. Field of the Invention

The present invention relates to an image forming apparatus such as a printer, a copying machine, a facsimile, or a complex machine of these apparatuses, and, more particularly to a tandem color image forming apparatus and a color image forming method.

2. Description of the Related Art

Among color image forming apparatuses such as a color printer and a color copying machine, there is a color image forming apparatus including four kinds of toners in total, i.e., a Y (yellow) toner, an M (magenta) toner, a C (cyan) toner, and a K (black) toner, which is used for, for example, printing of characters and the like, and an image transfer engine in which developing devices and drum-like photoconductive members corresponding to the toners are united as units to sequentially transfer images using transfer units of the respective units. The color image forming apparatus forms toner images on the respective photoconductive members and transfers the toner images onto a print sheet via a transfer belt as an intermediate transfer member or directly transfers the toner images onto the print sheet. The color image forming apparatus has a color printing mode for performing printing using these four kinds of toners and a monochrome printing mode for performing black and white printing using only one kind of toner, the K toner.

As a printing system in the color printing mode, there is a quadruple tandem system. In the quadruple tandem system, toner supplying devices, developing devices, and photoconductive members corresponding to the four kinds of toners, respectively, are united as process units and the respective process units are provided side by side on a sheet conveying path. High-speed print processing is realized by forming toner images of the respective colors on the respective photoconductive members and, then, sequentially transferring the respective toner images onto one piece of transfer paper in one process.

In the process units, deterioration due to friction and the like between the photoconductive members and the intermediate transfer belt occurs and wear between the rotating photoconductive members and the developing devices occurs. Thus, in the color image forming apparatus that employs the quadruple tandem system, in general, during the monochrome printing mode, unnecessary wear of the process units is prevented by setting the process unit for K in contact with the intermediate transfer belt and separating the other process units for Y, M, and C not in use from the intermediate transfer belt and the like to prevent other process units from operating.

However, in a print job in which monochrome image data and color image data are mixed, an image forming operation of the color image forming apparatus is stopped or suspended every time the color image forming apparatus performs an operation for switching the printing modes. Thus, as the number of times of switching of the printing mode increases, time until the print job is finished increases to deteriorate productivity (throughput) of printing.

As described above, in the quadruple tandem color image forming apparatus in the past, when it is attempted to improve the throughput of printing, wear of the process units is caused. Conversely, when the switching of the printing mode is performed by a mechanical method in an attempt to reduce wear of the process units, the throughput falls.

To cope with this problem, JP-A-2001-121788 proposes a color image forming apparatus that has the following function. The monochrome printing mode is set as default of a printing mode (a predefined or initial state of a printing mode adopted when a user does not set the printing mode). Although it is possible to switch the monochrome printing mode to the color printing mode during the execution of one print job, basically, the color image forming apparatus prohibits, once the monochrome printing mode is switched to the color printing mode, switching from the color printing mode to the monochrome printing mode until the print job is completed and allows, when a predetermined number of monochrome printed pages continue or when jobs for plural copies are designated in one print job, switching from the color printing mode to the monochrome printing mode in a break between specified numbers of the copies.

However, in the color image forming apparatus in the past, since the monochrome printing mode is set as the default of the printing mode, when a user mixes a color image in printing of a small number of images such as three images, it is necessary to switch the monochrome printing mode to the color printing mode. Thus, it takes a certain time to print only a few images. The color image forming apparatus cannot start printing until it is determined whether image data of a first image includes only monochrome print data or the image data includes color print data. As a result, the print start speed is low. For example, when the user attempts to print plural copies of image data of two images, first one of which is a monochrome image and a second one of which is a color image, the color image forming apparatus alternately prints monochrome image data and color image data and switches the printing mode to the default monochrome printing mode in breaks between the numbers of the copies. Thus, switching of the printing mode is performed every time a copy is printed. As a result, throughput of the printing considerably falls.

SUMMARY OF THE INVENTION

It is an object of an embodiment of the present invention to provide a color image forming apparatus and a color image forming method that can suppress, even in a print job in which data of a single color image such as a monochrome image and a color image are alternately printed, wear of process units while securing throughput of the print job in order to utilize quickness, which is an advantage of the quadruple tandem system.

In order to solve the problems, a color image forming apparatus according to an aspect of the present invention is a color image forming apparatus that has mode switching means for performing, on the basis of image data, image formation of which is instructed, switching of a printing mode between a single color printing mode for performing image formation in a state in which a transfer member and a single image bearing member are set in contact with each other and a color printing mode for performing image formation in a state in which the transfer member and plural image bearing members are set in contact with each other. The color image forming apparatus includes a calculating unit that calculates, on the basis of the number of pages subjected to image formation in the image data, the number of remaining pages not subjected to image formation yet, a setting unit that sets, on the basis of at least the number of remaining pages, the print mode in the single color printing mode or the color printing mode, and a control unit that controls the mode switching means to set the color printing mode for a top page to a first page in the image data and controls the mode switching means to set the printing mode set by the setting unit in a unit of a second number of pages after the first page.

In order to solve the problems, a color image forming apparatus according to another aspect of the present invention is a color image forming apparatus that has mode switching means for switching, on the basis of image data, image formation of which is instructed, a printing mode between a single color printing mode for performing image formation in a state in which a transfer member and a single image bearing member are set in contact with each other and a color printing mode for performing image formation in a state in which the transfer member and plural image bearing members including the single image bearing member are set in contact with each other. The color image forming apparatus includes a calculating unit that calculates, on the basis of the number of pages subjected to image formation in the image data, the number of remaining pages not subjected to image formation yet and a sheet size of image data not subjected to image formation yet, and calculates, on the basis of the number of remaining pages and the sheet size, an estimated remaining time until completion of image formation of the image data, a setting unit that sets, on the basis of at least the estimated remaining time, the printing mode in the single color printing mode or the color printing mode, and a control unit that controls, when image formation of the image data is performed, the mode switching means to perform image formation in the color printing mode from the start of driving of an image bearing member that comes into contact with the transfer member in both the single color printing mode and the color printing mode until a first time elapses and controls the mode switching means to perform image formation in the printing mode set by the setting unit at each interval of a second time after the elapse of the first time.

In order to solve the problems, a color image forming method according to still another aspect of the present invention is a color image forming method of applying control of a printing mode to a color image forming apparatus that has mode switching means for performing, on the basis of image data, image formation of which is instructed, switching of the printing mode between a single color printing mode for performing image formation in a state in which a transfer member and a single image bearing member are set in contact with each other and a color printing mode for performing image formation in a state in which the transfer member and plural image bearing members are set in contact with each other. The color image forming method includes calculating an initial value of the number of remaining pages not subjected to image formation yet by subtracting a number of a first page from the number of all pages of the image data, controlling the mode switching means to set the color printing mode for a top page to the first page in the image data, setting, on the basis of at least the number of remaining pages, the printing mode in the single color printing mode or the color printing mode, controlling the mode switching means to set the printing mode set by the setting unit for pages in a unit of a second number of pages after the first page, recalculating the number of remaining pages by setting a value obtained by subtracting the second number of pages from the number of remaining pages as the number of remaining pages again, and repeatedly executing the setting of the printing mode, the control of the mode switching means, and the recalculation of the number of remaining pages until image formation of all pages of the image data is performed.

DESCRIPTION OF THE EMBODIMENTS

Embodiments of the present invention will be hereinafter explained with reference to the accompanying drawings.

(First Embodiment)

Figure 1:
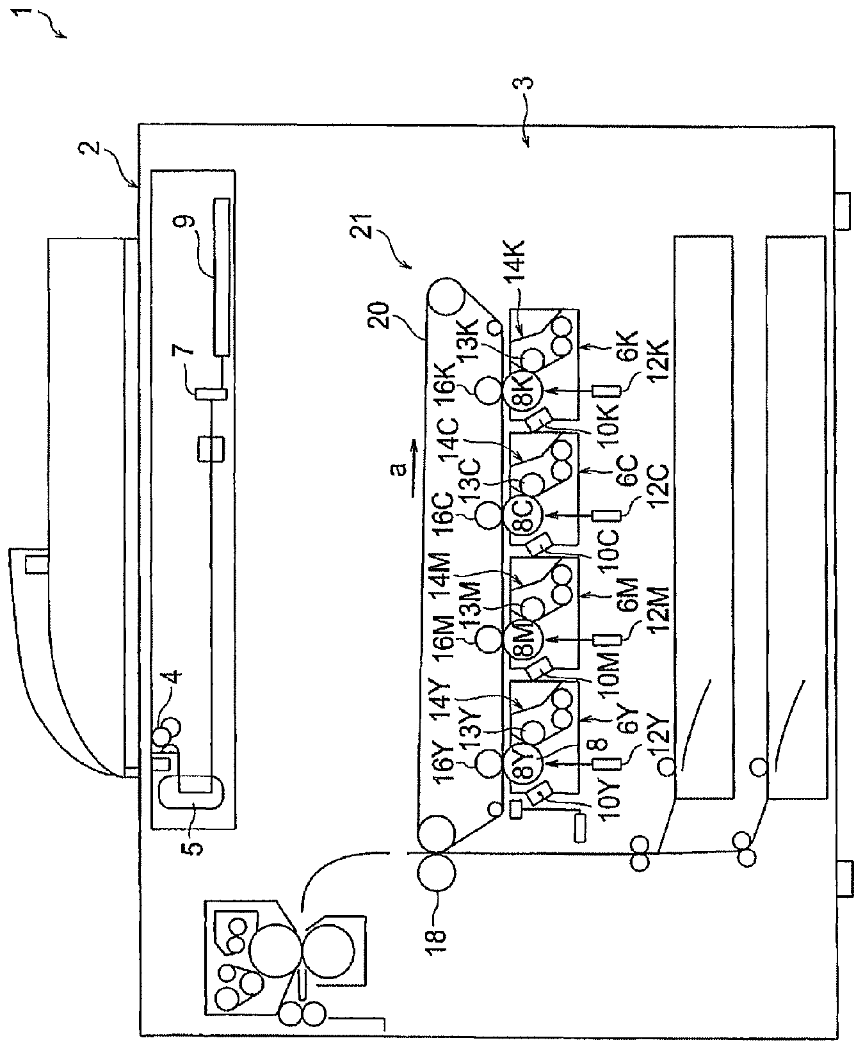
FIG. 1 is an overall diagram showing a color image forming apparatus according to an embodiment.
Figure 2:
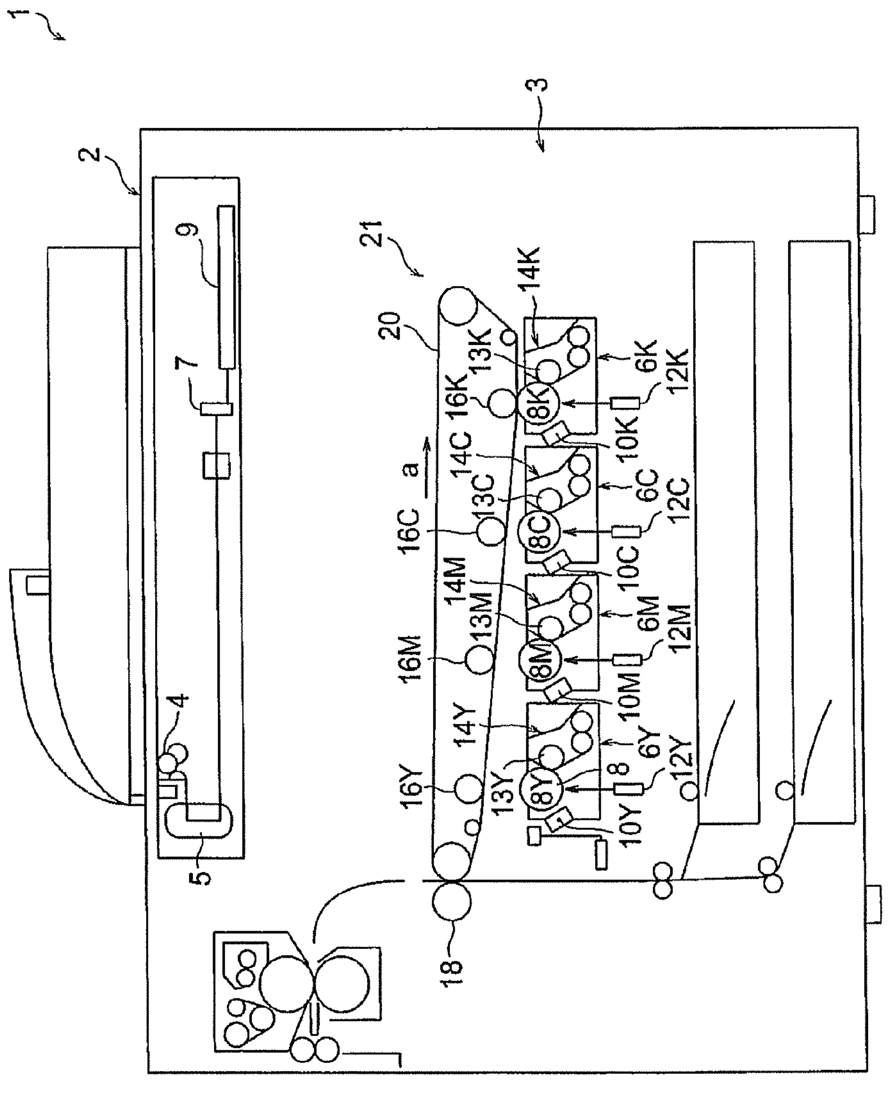
FIG. 2 is an overall diagram showing the color image forming apparatus according to the embodiment in which an intermediate transfer belt is separated.

FIGS. 1 and 2 are overall diagrams showing a color image forming apparatus according to a first embodiment of the present invention. FIG. 1 shows a color printing mode and FIG. 2 shows a monochrome printing mode. In this embodiment, the color printing mode is a printing mode for bringing, for example, process units for Y (yellow), M (magenta), C (cyan), and K (black) into contact with an intermediate transfer belt to perform image formation. The monochrome printing mode is a single color printing mode for setting a single color process unit in contact with the intermediate transfer belt and separating other process units not in use from the intermediate transfer belt to prevent the other process units from operating. Specifically, the monochrome printing mode is a printing mode for setting the process unit for K in contact with the intermediate transfer belt and separating the other process units for Y, M, and C not in use from the intermediate transfer belt to prevent the process units for Y, M, and C from operating.

The color image forming apparatus 1 includes a scanner unit 2 as a scanning function and a printer unit 3 as an image forming function.

The scanner unit 2 includes an exposure lamp 4 that irradiates light on an original, a reflecting mirror 5 that guides reflected light from the original, a CCD (Charge Coupled Device) 7 that captures the reflected light and converts image information into an analog signal, and a scanner main control unit 9 that controls the scanner unit 2. Image data captured by the CCD 7 is transmitted to a system main control unit 22 described later in the printer unit 3 via the scanner main control unit 9.

The printer unit 3 includes an intermediate transfer belt 20 as a transfer member and four process units 6Y, 6M, 6C, and 6K corresponding to respective colors of yellow (Y), magenta (M), cyan (C), and black (K).

The process units 6Y, 6M, 6C, and 6K respectively include photoconductive drums 8Y, 8M, 8C, and 8K as image bearing members, charging devices 10Y, 10M, 10C, and 10K that charge the photoconductive drums 8Y, 8M, 8C, and 8K, laser units 12Y, 12M, 12C, and 12K that form electrostatic latent images on the surfaces of the charged photoconductive drums 8Y, 8M, 8C, and 8K on the basis of image data transmitted to the system main control unit 22, developing devices 14Y, 14M, 14C, and 14K that have developing rollers 13Y, 13M, 13C, and 13K for depositing toners on the photoconductive drums 8Y, 8M, 8C, and 8K, and primary transfer rollers 16Y, 16M, 16C, and 16K as transfer means opposed to the photoconductive drums 8Y, 8M, 8C, and 8K respectively across the intermediate transfer belts 20. The process units 6Y, 6M, 6C, and 6K are arranged side by side along the intermediate transfer belt 20. Toner images transferred onto the intermediate transfer belt 20 by the primary transfer rollers 16Y, 16M, 16C, and 16K are transferred onto a print sheet conveyed by secondary transfer rollers 18 and is fixed on the print sheet by fixing after the transfer.

The printer unit 3 can be switched to, by single color (monochrome) mode and color modes switching means 21, a state shown in FIG. 1 in which the intermediate transfer belt 20 is set in press contact with the photoconductive drums 8Y, 8M, 8C, and 8K by the moving primary transfer rollers 16Y, 16M, 16C, and 16K and a state shown in FIG. 2 in which only the photoconductive drum 8K is set in press contact with the intermediate transfer belt 20 and the other photoconductive drums 8Y, 8M, and 8C not in use are separated from the intermediate transfer belt 20. Therefore, usually, in the color printing mode, printing is performed in the state in FIG. 1. In the single color (monochrome) printing mode, printing is performed in the state in FIG. 2.

Figure 3:
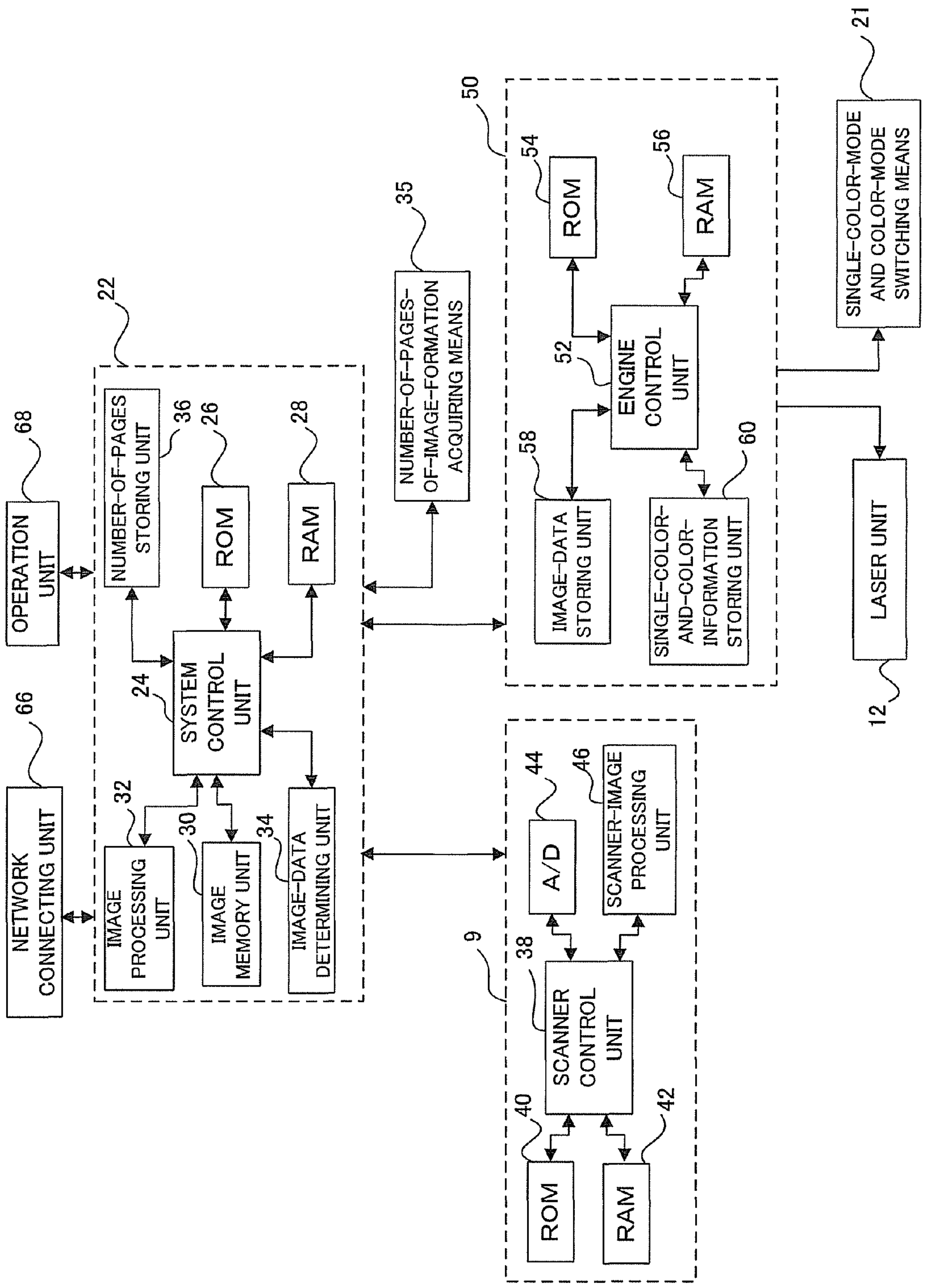
FIG. 3 is a control block diagram of the color image forming apparatus according to the embodiment.

FIG. 3 is a block diagram of a control system that controls operations of the color image forming apparatus 1.

The color image forming apparatus 1 according to this embodiment includes the system main control unit 22, a printer main control unit 50, and the scanner main control unit 9.

The system main control unit 22 is arranged in the printer unit 3 and has a function as the center of the entire system in the color image forming apparatus 1. The system main control unit 22 communicates with a scanner control unit 38 of the scanner main control unit 9 and an engine control unit 52 of the printer main control unit 50 and gives an operation command to the scanner main control unit 9 and the printer main control unit 50 on the basis of information inputted from a PC or the like connected thereto through an operation unit 68 and a network connecting unit 66 described later.

The system main control unit 22 includes a system control unit (e.g., a CPU) 24 that controls the entire system main control unit 22, a ROM (a storing unit) 26 that stores a control program of the system control unit 24 and various data, a RAM 28 serving as a work area of the system control unit 24, an image memory unit 30 for storing various data such as image data having color space information transmitted from external terminals such as a PC and a server connected to via the network connecting unit 66, image data captured by the scanner unit 2, or image data created on the basis of the image data, an image processing unit 32 that applies various kinds of image processing to the captured image data and converts the image data into, for example, YMCK image data, an image-data determining unit 34 for determining whether the image data having the color space information is monochrome image data or color image data, and number-of-pages-of-image-formation acquiring means 35 for acquiring the number of pages of printed image data.

The system main control unit 22 further includes a number-of-pages storing unit 36 that has a first number-of-pages storing unit 36*a* for storing the number of (printed) pages Q (the number of copies) of image data printed after one print job is started, which is acquired by the number-of-pages-of-image-formation acquiring means 35, a second number-of-pages storing unit 36*b* for storing the number of all pages R (the number of all copies) of image data in one print job, third and fourth number-of-pages storing units 36*c* and 36*d* for storing a first number of copies for operation switching determination X1 that can be set in advance and a second (another) number of copies for operation switching determination X2, respectively, and a fifth number-of-pages storing unit 36*e* for storing the number of (remaining) pages S of the remaining image data in one print job. Rewritable nonvolatile memories are used as the third and fourth number-of-pages storing units 36*c* and 36*d*. Rewritable nonvolatile memories or volatile memories or buffers are used as the first, second, and fifth number-of-pages storing units 36*a*, 36*b*, and 36*e*.

Among the data stored in the number-of-pages storing unit 36, the first and second numbers of operation switching determination copies X1 and X2 can be set by a manufacturer in advance. Alternatively, a user can set and change the first and second numbers of operation switching determination copies X1 and X2 from the PC or the operation unit 68 according to a state of use. The system main control unit 22 determines (sets) whether the single color printing mode or the color printing mode should be set as the printing mode using the data Q, R, X1, and X2 stored in the number-of-pages storing unit 36 and using the image-data determining unit 34. The system main control unit 22 transmits a result of the determination to the printer main control unit 50 and outputs YMCK image data obtained by the image processing unit 32 to the printer main control unit 50 (details are described later).

The scanner main control unit 9 is a unit that mainly controls a scan function. The scanner main control unit 9 includes the scanner control unit 38 that controls the entire scanner main control unit 9, a ROM 40 that stores a control program of the scanner control unit 38 and various data, a RAM 42 serving as a work area of the scanner control unit 38, an A/D converter 44 that converts an analog signal outputted from a CCD into a digital signal, and a scanner-image processing unit 46 that processes image data of an original scanned by scanning. The image data processed here is transmitted to the system main control unit 22 and, then, outputted to the printer main control unit 50.

The printer main control unit 50 is a unit that mainly controls a printing function of the printer unit 3. The printer main control unit 50 includes the engine control unit 52 that controls the entire printer main control unit 50, a ROM 54 that stores a control program of the engine control unit 52 and various data, a RAM 56 serving as a work area of the engine control unit 52, an image-data storing unit 58 that stores YMCK image data transmitted from the system main control unit 22, and a single-color-and-color-information storing unit (a printing-mode storing unit) 60 that stores a determination result transmitted from the system main control unit 22 concerning whether the YMCK image data stored in the image-data storing unit 58 should be printed in the single color printing mode or printed in the color printing mode and stores a present printing mode.

The printer main control unit 50 constitutes a control unit of the printer unit 3 together with the system main control unit 22. The engine control unit (the switching control means) 52 gives an operation command to the laser unit and the single-color-mode and color-mode switching means 21 that switches between the single color printing mode and the color printing mode. The single-color-mode and color-mode switching means 21 performs press contact and separation of the intermediate transfer belt 20 and the photoconductive drums by performing press contact and separation of the intermediate transfer belt and the process unit, i.e., moving the intermediate transfer belt 20 with respect to the process unit.

Figure 4:
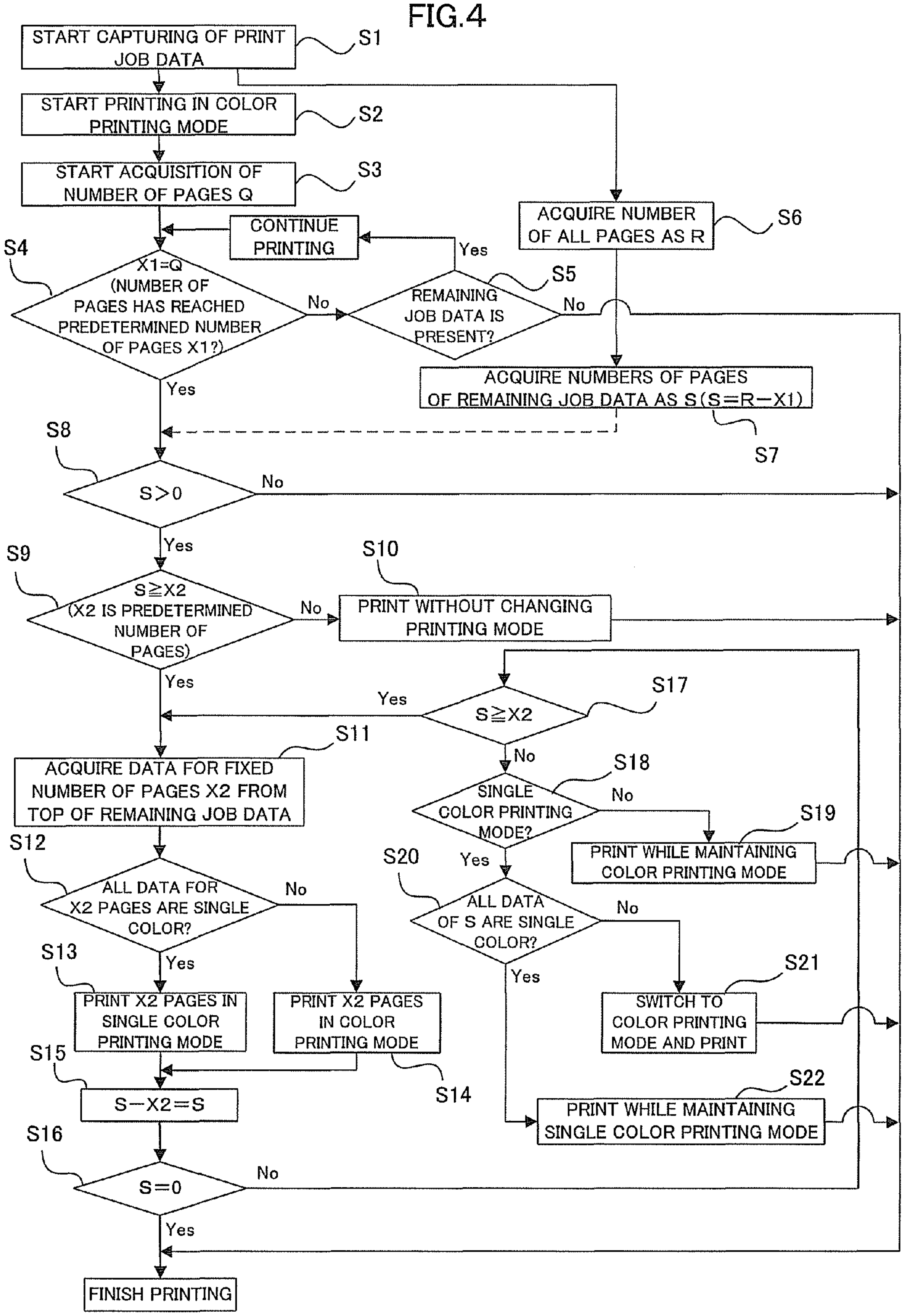
FIG. 4 is a flowchart showing a switching operation of the color image forming apparatus according to the embodiment.

A printing operation of the color image forming apparatus according to this embodiment is explained with reference to FIG. 4. FIG. 4 is a flowchart showing the printing operation of the color image forming apparatus according to this embodiment.

Usually, the user can select full color, single color (e.g., monochrome), and automatic printing modes from a printing property of a printer driver of the PC by operating the operation panel (the operation unit) 68. When the full color or single color printing mode is selected, in one print job, printing of all image data is completed in the selected printing mode. In other words, when the full color printing mode is selected, the printing is completed in the color printing mode and, when the single color printing mode is selected, the printing is completed in the single color printing mode. On the other hand, when the automatic printing mode is selected, in one print job, image data is printed in an auto-color printing mode while the single color printing mode and the color printing mode are switched on the basis of the image data. Therefore, a printing operation at the time when printing is started in the auto-color printing mode is described. In the following explanation, the "single color printing mode" means a monochrome printing mode in which a K toner is used as a single color toner of the single color printing mode, the process unit 6K for K is set in contact with the intermediate transfer belt 20 and the other process units 6Y, 6M, and 6C for Y, M, and C not in use are separated from the intermediate transfer belt 20 and the like to prevent the process units 6Y, 6M, and 6C from operating.

An initial state (default) of the printing mode is the color printing mode in which the photoconductive drums 8Y, 8M, 8C, and 8K are in press contact with the intermediate transfer belt 20.

First, when the PC or the like requests image formation, a print job start command is transmitted to the system main control unit 22 via the network connecting unit 66 and capturing of image data of a print job is started by the system main control unit 22 (step S1). Among all image data of one print job, image data from the beginning to an X1 page of the print job (when the number of all pages of all the image data of the one print job is smaller than the first number of copies for operation switching determination X1 set in advance, the image data of all pages), is converted into YMCK image data by the image processing unit 32 and, then, immediately outputted to the printer main control unit 50 not through the image-data determining unit 34. Image formation is started in the printer unit 3 (step S2). At this point, the printing mode is the color printing mode in default and the photoconductive drums 8Y, 8M, 8C, and 8K and the intermediate transfer belt 20 are already in contact with each other. Thus, the YMCK image data outputted to the printer main control unit 50 is quickly subjected to the image formation.

When the image formation is started, for example, the number-of-pages-of-image-formation acquiring means 35 detects completion of the image formation on the intermediate transfer belt and passage of a sheet through a fixing unit using a sensor or detects and counts sheets for which the image formation is completed on the basis of a size of a print sheet, the number of revolutions of a conveying roller and the like, a sheet feeding interval, and the like. Acquisition of the number of pages Q (the number of copies) of printed image data after the one print job is started and the number of pages Q is stored in the first number-of-pages storing unit 36*a* of the number-of-pages storing unit 36 (step S3).

Subsequently, until the number of pages Q reaches the first number of copies for operation switching determination X1, steps S4 and S5 are repeated. Specifically, for example, every time the image formation on the intermediate transfer belt 20 is completed, the number of pages Q stored in the number-of-pages storing unit 36*a* and the predetermined number of pages X1 stored in the third number-of-pages storing unit 36*c* are compared by the system control unit 24. It is determined by the system control unit 24 whether the number of pages Q has reached the predetermined number of pages X1 (step S4). The system control unit 24 also functions as a comparing unit for comparing information stored in the number-of-pages storing unit 36 as indicated by step S4.

As a result of step S4, when the number of pages Q for which the image formation is already completed is less than the predetermined number of pages X1, the processing proceeds to step S5. When there is remaining job data, the image formation is continued. When there is no remaining job data, the image formation is completed.

On the other hand, when capturing of print job data is started in step S1 and image data of one print job is completely transmitted from the PC or the like to the system main control unit 22, the number of all pages R of the image data in the one print job is stored in the second number-of-pages storing unit 36*b* of the number-of-pages storing unit 36 (step S6). When the number of all pages R is acquired in step S6, the number of remaining job data S (S=R−X1), which is the number of remaining pages of the print job, is acquired by the system control unit 24 using the number of all pages R in the number-of-pages storing unit 36 and the predetermined number of pages X1 and stored in the fifth number-of-pages storing unit 36*e* of the number-of-pages storing unit 36 (step S7). In this way, steps S6 and S7 are performed in parallel with the image formation and the image formation is immediately started in the color printing mode as indicated by step S2, whereby throughput of the print job at the start of the image formation is improved.

Operations performed when the number of all pages R of one print job data is equal to or larger than the predetermined number of pages X1 are explained. In this embodiment, various determinations in step S8 and the subsequent steps are performed by the system control unit 24 in advance while steps S4 and S5 are performed. After that, image formation is performed in accordance with results of the determinations. Therefore, when it is determined that the number of pages Q, for which the printing is performed, counted by the number-of-pages-of-image-formation acquiring means 35 reaches the predetermined number of pages X1 in step S4, the processing can immediately shift to the next operation such as image formation and operation mode switching. However, when the determinations are not finished while steps S4 and S5 are performed, the remaining various determinations are continued in parallel with the image formation.

When there is no acquired remaining job data ($S \leqq 0$) in step S8, the image formation is finished. When there is the number of remaining job data S ($S>0$), the processing proceeds to step S9. The second number of copies for operation switching determination X2 set in advance, which is stored in the fourth number-of-pages storing unit 36*d* of the number-of-pages storing unit 36, is compared with the number of remaining job data S by the system control unit 24.

When the number of remaining job data S is smaller than the predetermined number of pages X2, the image formation for the remaining image data is continued and finished without changing the printing mode regardless of whether the remaining image data is monochrome or color (step S10).

On the other hand, when the number of remaining job data S is equal to or larger than the predetermined number of pages X2, image data is captured into the image-data determining unit 34 of the system main control unit 22 in a unit of X2 pages from the beginning of the remaining job data (step S11). It is determined whether all the image data are monochrome images or the image data include a color image (step S12). A result of the determination by the image-data determining unit 34 is outputted to the printer main control unit 50 together with the YMCK image data in X2 page units stored in the image memory unit 32. The result of the determination on whether all the image data in X2 page units outputted from the system main control unit 22 are monochrome images or the image data include a color image is stored in the single-color-and-color-information storing unit 60. The YMCK image data in X2 page units is stored in the image-data storing unit 58. The image-data storing unit 58 does not always have to be provided in the printer main control unit 50 and may be provided on the system main control unit 22. Alternatively, the YMCK image data may be directly read out from the image memory unit.

The single-color-mode and color-mode switching means 21 is controlled by the engine control unit 2 on the basis of the result of the determination on the image data in X2 page units stored in the single-color-and-color-information storing unit 60 and the printing mode is switched. When all the image data in X2 page units are single color, image formation of the image data in X2 page units is performed in the single color printing mode (step S13). When the image data in X2 page units include a color image, image formation of the image data in X2 page units is performed in the color printing mode (step S14). In the number-of-pages storing unit 36, the predetermined number of pages X2 is subtracted from the number of remaining job data S and the number of remaining job data S is updated (step S15). In step S16, when there is no number of remaining job data S (S=0), the image formation is completed. The number of remaining job data S may be updated in X2 page units or may be updated every time the number of remaining job data S is counted by the number-of-pages-of-image-formation acquiring means 35.

On the other hand, when there is the number of remaining job data S in step S16, as in step S9, the predetermined number of pages X2 stored in the fourth number-of-pages storing unit 36*d* of the number-of-pages storing unit 36 and the updated number of remaining job data S are compared by the system control unit 24 (step S17). When the number of remaining job data S is equal to or larger than the predetermined number of pages X2 (S>X2), the processing proceeds to step S11 and the operations described above are repeated. When the number of remaining job data S is smaller than the predetermined number of pages X2 (S<X2), the processing proceeds to step S18. Depending on the determination in step S12, the printing mode stays in the default color printing mode or is switched to the single color printing mode. Thus, in step S18, a present printing mode of the single-color-mode and color-mode switching means 21 is determined by the engine control unit 52.

When the printing mode of the single-color-mode and color-mode switching means 21 is the color printing mode in step S18, even if all the remaining job data are single color, the image formation of the remaining data is performed without changing the printing mode from the color printing mode and the print job is completed (step S19). On the other hand, when the printing mode is the single color printing mode, it is determined by the image-data determining unit 34 whether all the remaining job data are single color images or the remaining job data include a color image (step S20). A result of the determination is outputted to the printer main control unit 50 together with the YMCK image data in X2 page units stored in the image memory unit 32. The result of the determination on the image data in X2 page units is stored in the single-color-and-color-information storing unit 60. The YMCK image data in X2 page units is stored in the image-data storing unit 58. When the image data in X2 page units include a color image according to the result of the determination stored in the single-color-and-color-information storing unit 60, the single-color-mode and color-mode switching means 21 is controlled by the engine control unit 52, the printing mode is switched to the color printing mode, image formation of the remaining data is performed (step S21), and the print job is completed. On the other hand, when all the image data in X2 page units are single color, the printing mode is not changed, the image formation is continued, and the print job is completed (step S22).

The setting and the change of the predetermined numbers of pages X1 and X2 can also be performed during image formation. In this case, a newly set value of the predetermined number of pages X1 is reflected on the next image formation of a print job. On the other hand, if a step of image formation is before step S9, a newly set value of the predetermined number of pages X2 is immediately reflected on image formation after step S9. When the predetermined number of pages X2 is changed between step S9 and step S15, the predetermined number of pages X2 is reflected at a point of step S17. When the predetermined number of pages X2 is updated after step S18, the predetermined number of pages X2 is reflected on the next image formation of a print job.

In the above description, the determination on switching of the printing mode after the predetermined number of pages X1 is performed until the number of printed pages reaches the predetermined number of pages X1 in step S4. However, depending on performance of the color image forming apparatus, the determination on switching may be performed for each image data in X2 page units at a point when the image formation in X1 and X2 page units is completed in steps S4 and s16. Alternatively, the determination on switching may be performed for each image data in X2 page units while the image formation is performed.

As described above, in the auto-color mode, the color printing mode is set as default of the printing mode of the color image forming apparatus, the predetermined number of pages X1, which can be set and changed, is determined in advance. When image formation is requested, the image formation is immediately started and determination on single color or color of image data is not performed and an operation for switching the printing mode is not performed until the number of printed pages reaches the first predetermined number of pages X1. Consequently, throughput of a print job at the start of the image formation is improved. Therefore, the color image forming apparatus 1 can prevent a state in which time for grasping data is consumed and printing is not started, for example, when image formation is started after an amount of all image data of the print job is grasped and prevent throughput at the start of the image formation from falling. Moreover, unlike the color image forming apparatus in the past, in the color image forming apparatus 1, when the number of copies of requested image formation is equal to or smaller than the first predetermined number of pages X1, since an operation for switching the printing mode is not interposed in the image formation, throughput of the image formation is high.

When the number of copies of requested image formation is equal to or larger than the first predetermined number of pages X1, the printing mode is switched with the second predetermined number of pages X2, which can be set and changed in advance, set as a reference for determination. Consequently, even when a print jot in which single color image data and color image data are alternately requested is performed without awareness of a user, the color image forming apparatus 1 can suppress wasteful wear of the process units while securing throughput of the print job in order to utilize quickness, which is an advantage of the quadruple tandem system.

Moreover, the determination on switching of the printing mode after the first predetermined number of pages X1 can be performed until the number of printed pages reaches the predetermined number of pages X1. By performing parallel processing in this way, the color image forming apparatus 1 can prevent a state in which time for grasping data is consumed and printing is not started, for example, when image formation is started after an amount of the remaining image data of the print job is grasped after the image formation reaches the first predetermined number of pages X1 and prevent throughput at the start of the image formation from falling.

In a general full color printing mode, printing of a black image is performed by superimposing plural colors of Y, M, C, and K one on top of another. However, in the "color printing mode" according to the first embodiment, printing of a black image may be actually performed using only the K toner although the photoconductive drums Y, M, C, and K are set in press contact with the intermediate transfer belt.

In the first embodiment, the single-color-mode and color-mode switching means 21 performs press contact and separation of the intermediate transfer belt 20 and the photoconductive drums 8Y, 8M, 8C, and 8K by moving the intermediate transfer belt 20 with respect to the photoconductive drums. However, not being limited by the construction described, the single-color-mode and color-mode switching means 21 may perform press contact and separation of the intermediate transfer belt 20 and the photoconductive drums 8Y, 8M, 8C, and 8K by moving the photoconductive drums 8Y, 8M, 8C, and 8K. In this case, the single-color-mode and color-mode switching means 21 can bring any one of the photoconductive drums 8Y, 8M, 8C, and 8K into press contact with the intermediate transfer belt 20. Thus, as the printing mode, not only the monochrome printing mode but also, for example, a single color printing mode of Y is possible. Single color (Y, M, C, or K) and color printing modes are also possible.

The color image forming apparatus 1 according to the first embodiment manages, as a reference for determination of the switching operation of the printing mode, the predetermined numbers of pages X1 and X2, the number of pages Q counted by the number-of-pages-of-image-formation acquiring means 35, and the like with the number of pages. However, the predetermined numbers of pages X1 and X2, the number of pages Q, and the like may be managed by calculating time required for image formation of the number of printed pages or the number of remaining pages using a timer or the like as the number-of-pages-of-image-formation acquiring means 35. Details are explained in a second embodiment.

In the color image forming apparatus 1 according to the first embodiment, it is determined by the image-data determining unit 34 whether image data, image formation of which is instructed, is monochrome image data or color image data. However, for example, when image data, image formation of which is instructed, is transmitted from the PC, if it is already determined on the PC whether the image data is monochrome image data or color image data and, information on a result of the determination is transmitted to the color image forming apparatus together with the image data, the image-data determining unit 34 provided in the color image forming apparatus does not always have to perform the determination on the image data.

In the color image forming apparatus 1 according to the first embodiment, a toner image transferred onto the intermediate transfer belt 20 is transferred onto a print sheet conveyed by the secondary transfer rollers 18. However, it is also possible that the intermediate transfer belt 20 is not provided, a sheet is conveyed by a transfer belt, and toner images formed on the photoconductive drums 8 are transferred on to a sheet while the sheet is conveyed.

Figure 5:
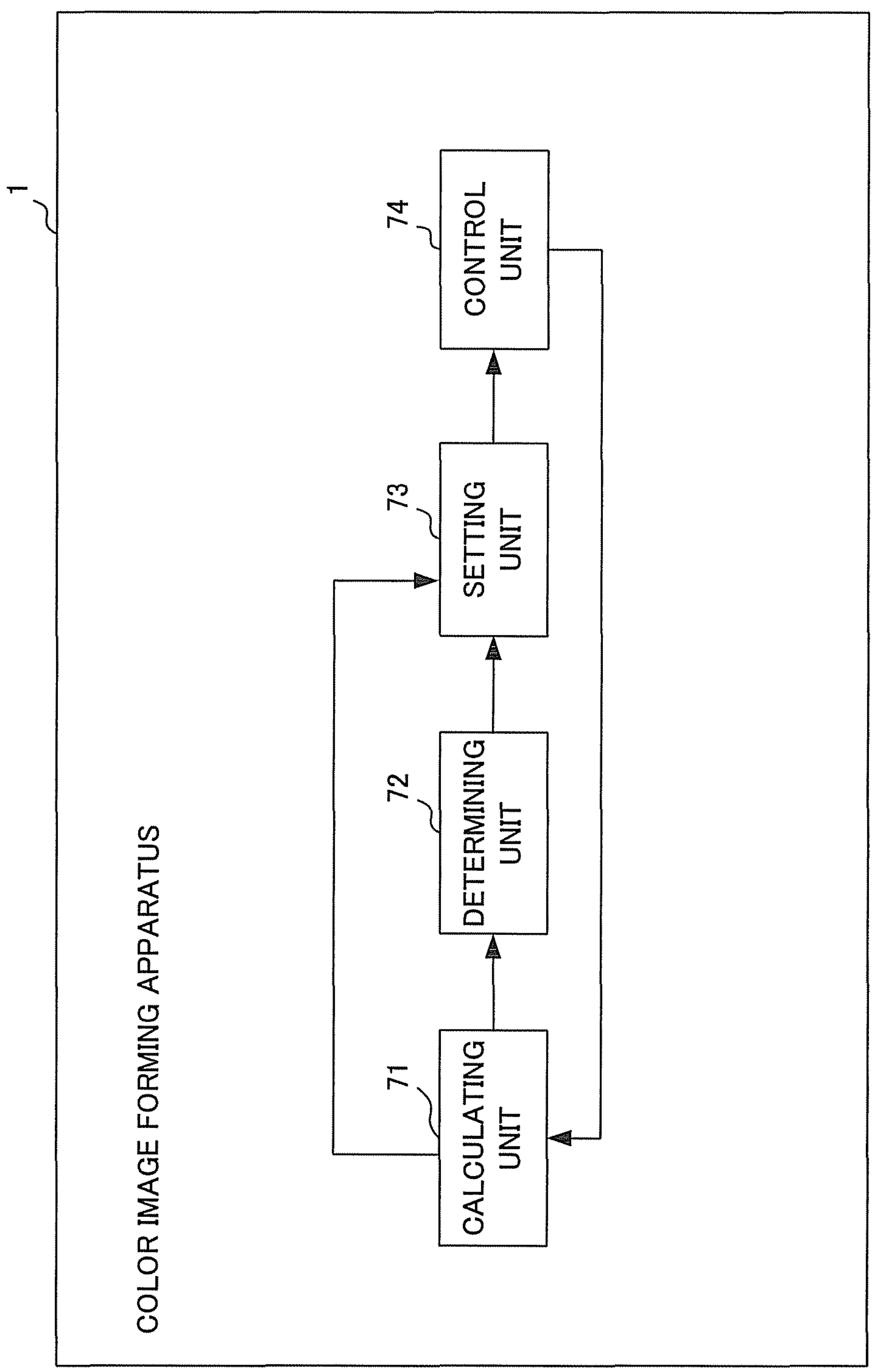
FIG. 5 is a function block diagram of the color image forming apparatus according to the embodiment.

Functions of the color image forming apparatus according to this embodiment are explained with reference to FIG. 5 on the basis of the control system block described above. The color image forming apparatus 1 includes a calculating unit 71, a determining unit 72, a setting unit 73, and a control unit 74.

The calculating unit 71 calculates, on the basis of the number of pages subjected to image formation in image data, the number of remaining job data S (the number of remaining pages) not subjected to image formation yet. The determining unit 72 determines whether there is a color image in image data for the second predetermined number of pages X2 (the second number of pages) from a top page in image data of the number of remaining job data S.

The setting unit 73 sets the printing mode in the single color printing mode or the color printing mode on the basis of at least the number of remaining job data S. The control unit 71 controls the single-color-mode and color-mode switching means 21 (the mode switching means) to set the color printing mode for a top page to the first predetermined number of pages X1 (the first page) in image data. The control unit 71 controls the single-color-mode and color-mode switching means 21 to set the printing mode set by the setting unit 73 for the predetermined number of X2 page units after the first predetermined number of page units X1.

Concerning correspondence between the control system block (FIG. 3) and the function block (FIG. 5) of the color image forming apparatus 1, the calculating unit 71 corresponds to the number-of-pages-of-image-formation acquiring means 35, the first number-of-pages storing unit 36*a*, the second number-of-pages storing unit 36*b*, and the system control unit 24. The determining unit 72 corresponds to the image-data determining unit 34. The setting unit 73 corresponds to the fifth number-of-pages storing unit 36*e*, the system control unit 24, and the engine control unit 52. The control unit 74 corresponds to the third number-of-pages storing unit 36*c*, the fourth number-of-pages storing unit 36*d*, the system control unit 24, the single-color-and-color-information storing unit 60, and the engine control unit 52.

Figure 6:
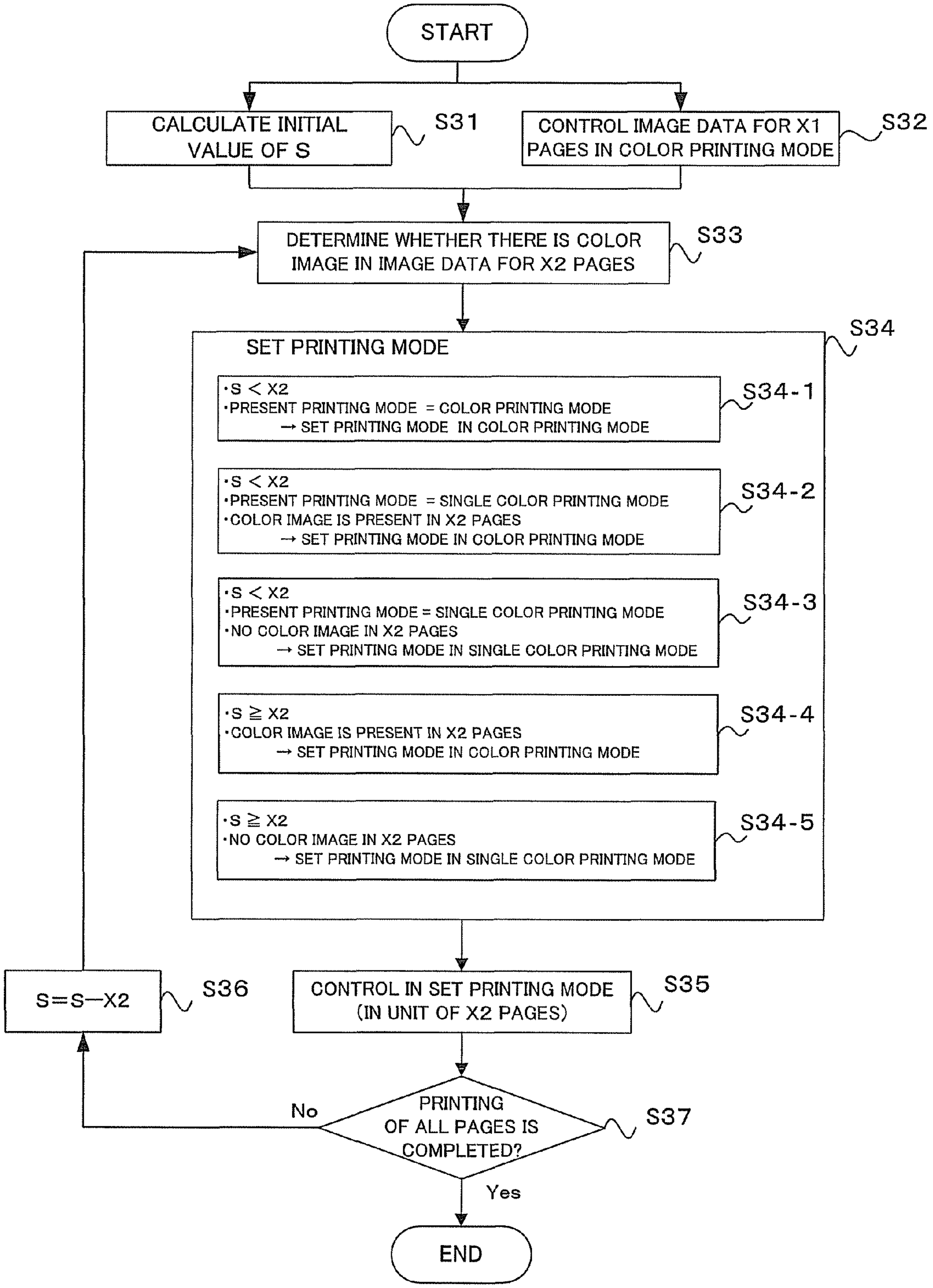
FIG. 6 is a flowchart showing processing by function blocks of the color image forming apparatus according to the embodiment.

Processing performed by the color image forming apparatus 1 is shown in a flowchart in FIG. 6 on the basis of the function block.

The calculating unit 71 acquires the first predetermined number of pages X1 and the number of all pages R of image data and subtracts the first predetermined number of pages X1 from the number of all pages R to calculate an initial value of the number of remaining job data S not subjected to image formation yet (step S31). The control unit 74 controls the single-color-mode and color-mode switching means 21 to set the color printing mode for a top page to the first predetermined number of pages X1 in the image data (step S32). Image formation from the top page to the first predetermined number of pages X1 is performed. The calculation of the initial value of the number of remaining job data S (step S31) and the control and the image formation from the top page to the first predetermined number of pages X1 are performed as parallel processing.

The determining unit 72 determines whether there is a color image in image data for the second predetermined number of pages X2 from a top page in the image data of the number of remaining pages (step S33). The setting unit 73 sets the printing mode in the single color printing mode or the color printing mode (step S34).

A method of setting the printing mode by the setting unit 73 is explained. When the number of remaining job data S is smaller than the second predetermined number of pages X2 and a present printing mode is the color printing mode, the setting unit 73 sets the printing mode in the color printing mode (step S34-1). When the number of remaining job data S is smaller than the second predetermined number of pages X2, a present printing mode is the single color printing mode, and it is determined by the determining unit 72 that there is a color image, the setting unit 73 sets the printing mode in the color printing mode (step S34-2). When the number of remaining job data S is smaller than the second predetermined number of pages X2, a present printing mode is the single color printing mode, and it is determined by the determining unit 72 that there is no color image, the setting unit 73 sets the printing mode in the single color printing mode (step S34-3).

When the number of remaining job data S is equal to or larger than the second predetermined pages X2 and it is determined by the determining unit 72 that there is a color image, the setting unit 73 sets the printing mode in the color printing mode (step S34-4). When the number of remaining job data S is equal to or larger than the predetermined number of pages X2 and it is determined by the determining unit 72 that there is no color image, the setting unit 73 sets the printing mode in the single color printing mode (step S34-5).

As described above, the setting unit 73 sets the printing mode in the single color printing mode or the color printing mode on the basis of at least the number of remaining pages (a combination of the number of remaining pages and a present printing mode, a combination of the number of remaining pages and a determination result of the determining unit 72, or a combination of the number of remaining pages, a present printing mode, and a determination result of the determining unit 72).

The control unit 74 controls the single-color-mode and color-mode switching means 21 to set the printing mode in a printing mode set by the setting unit 73 in a unit of the second predetermined number of pages X2 (step S35).

As described above, the control unit 74 controls the single-color-mode and color-mode switching means 21 to set the color printing mode for a top page to the first predetermined number of pages X1 in the image data. The control unit 74 controls the single-color-mode and color-mode switching means 21 to set the printing mode set by the setting unit 73 for pages after the first predetermined number of pages X1 in a unit of the second predetermined number of pages X2.

When image formation for pages for which the printing mode is controlled by the control unit 74 (in a unit of the second predetermined number of pages X2) is completed, it is determined whether image formation for all image data after completion has been completed (step S37). When the image formation for all the image data has not been completed (step S37, No), the calculating unit 71 subtracts the second predetermined number of pages X2, which is the number of pages subjected to image formation, from the number of remaining job data S to calculate the present number of remaining job data S again (step S36). Thereafter, the processing returns to step S33.

On the other hand, when the image formation for all the image data has been completed (step S37, Yes), the processing is finished.

After the processing in step S31 is performed, the setting unit 73 may compare the number of remaining job data S (i.e., an initial value of the number of remaining job data S) and the second predetermined number of pages X2 (processing same as that in step S9 in FIG. 4) before the processing in step S33. In that case, the setting unit 73 sets the printing mode in the color printing mode when the number of remaining job data S is smaller than the second predetermined number of pages X2 (in this case, the setting unit 73 sets the printing mode according to only the number of remaining job data S). The control unit 74 performs the control processing (step S35). In this way, the color image forming apparatus 1 can omit the determination processing by the determining unit 72 and the confirmation of a present printing mode (since the initial state of the printing mode is the color printing mode, confirmation of a present printing mode can also be omitted). The color image forming apparatus 1 can obtain a setting result (the color printing mode) same as that in the processing in steps S33, S34-1, and S35. Thus, the color image forming apparatus 1 can further improve throughput.

Correspondence between the flowchart in the control block (see FIG. 4) and the flowchart in the function block (see FIG. 6) is described. Step S31 in FIG. 6 corresponds to steps S6 and S7 in FIG. 4. Step S32 in FIG. 6 corresponds to steps S2 to S5 in FIG. 4. In the flow from step S33 to step S35, a determination result in step S34-1 corresponds to steps S9, S10, S17, S18, and S19 in FIG. 4. A determination result in step S34-2 corresponds to steps S17, S18, S20, and S21 in FIG. 4.

In the flow from step S33 to S35 in FIG. 6, a determination result in step S34-3 corresponds to steps S17, S18, S20, and S22 in FIG. 4. A determination result in step S34-4 corresponds to steps S9, S11, S12, and S14 in FIG. 4. A determination result in step S34-5 corresponds to steps S9, S11, S12, and S13 in FIG. 4.

Step S36 in FIG. 6 corresponds to step S15 in FIG. 4. Step S37 in FIG. 6 corresponds to steps S8 and S16.

(Second Embodiment)

The color image forming apparatus 1 according to the first embodiment manages a switching operation for the printing mode using the number of pages such as the predetermined numbers of pages X1 and X2 or the number of pages Q counted by the number-of-pages-of-image-formation acquiring means 35 as a reference for determination of the switching operation of the printing mode. However, the switching operation for the printing mode may be managed on the basis of time required for image formation of the number of printed pages or the number of remaining pages using a timer provided in the number-of-pages-of-image-formation acquiring means 35. A color image forming apparatus according to a second embodiment of the present invention uses time as a reference for determination of a switching operation of the printing mode in this way.

Functions of the color image forming apparatus 1 according to the second embodiment are explained. As a control block diagram and a function block diagram, FIG. 3 and FIG. 5 are applied, respectively.

The calculating unit 71 calculates, on the basis of the number of pages subjected to image formation in image data, the number of remaining job data S (the number of remaining pages) not subjected to image formation yet and a sheet size (e.g., the A3 size, the A4 size, etc. as standard sizes in Japan) of image data not subjected to image formation yet and calculates an estimated remaining time until completion of image formation of the image data on the basis of the number of remaining job data S and the sheet size.

Required times per a unit number of copies of a color image and a monochrome image are defined and set in advance for each of the sheet sizes such as time per a unit number of copies required for forming a color image of the A3 size and time per a unit number of copies required for forming a monochrome image of the A4 size. Thus, the estimated remaining time is calculated on the basis of these set values and the number of remaining job data S. It is possible to obtain a more accurate estimated remaining time by taking into account a type of a sheet (e.g., plain paper or an OHP sheet) and a printing mode switching time of the single-color-mode and color-mode switching means 21.

The determining unit 72 determines whether there is a color image in image data for the number of pages subjected to image formation in a predetermined time (hereinafter referred to as T2 time (second time)) from a top page in image data of the number of remaining job data S. The number of pages that can be processed in the T2 time can be calculated on the basis of the required times per a unit number of copies of the color image and the monochrome image for each of the sheet sizes and the T2 time.

The setting unit 73 sets the printing mode in the single color printing mode or the color printing mode on the basis of at least the estimated remaining time (a combination of the estimated remaining time and a determination result of the determining unit 72, a combination of the estimated remaining time and a present printing mode, and a combination of the estimated remaining time, a determination result of the determining unit 72, and a present printing mode).

A setting method of the setting unit 73 can be considered the same as that in the first embodiment. In other words when the estimated remaining time is shorter than the T2 time and a present printing mode is the color printing mode, the setting unit 73 sets the printing mode in the color printing mode. When the estimated remaining time is equal to or longer than the T2 time and it is determined by the determining unit 72 that there is a color image, the setting unit 73 sets the printing mode in the color printing mode. When the estimated remaining time is equal to or longer than the T2 time and it is determined by the determining unit 72 that there is no color image, the setting unit 73 sets the printing mode in the single color printing mode. When the estimated remaining time is shorter than the T2 time, a present printing mode is the single color printing mode, and it is determined by the determining unit 72 that there is a color image, the setting unit 73 sets the printing mode in the color printing mode. When the estimate remaining time is shorter than the T2 time, a present printing mode is the single color printing mode, and it is determined by the determining unit 72 that there is no color image, the setting unit 73 sets the printing mode in the single color printing mode.

When image formation of image data is performed, the control unit 74 controls the single-color-mode and color-mode switching means 21 to set the printing mode in the color printing mode until a predetermined time (hereinafter referred to as T1 time (first time)" elapses from the start of driving of the photoconductive drum 8K (a photoconductive drum that comes into contact with the intermediate transfer belt 20 in both the single color printing mode and the color printing mode) After the elapse of the T1 time, the control unit 74 controls the single-color-mode and color-mode switching means 21 to set the printing mode in the printing mode set by the setting unit 73 at each interval of the T2 time. A driving time of the photoconductive drum 8K is set as a reference because the photoconductive drum 8K is always driven in both the modes.

Time is managed by providing a timer in the number-of-pages-of-image-formation acquiring means 35. In other words, it is managed by the timer whether the time has reached the T1 time and the T2 time from the start of driving of the photoconductive drum 8K.

Like the predetermined number of pages X1 and X2 in the first embodiment, the T1 time and the T2 time can be set by a manufacturer in advance or set by a user according to a state of use.

When the time has reached a control time (the T1 time or the T2 time) while image formation is applied to a sheet, the control unit 74 controls the printing mode immediately after the image formation of the sheet presently processed is completed.

Until the T1 time elapses from the start of driving of the photoconductive drum 8K, the calculating unit 71 set an initial value of the estimated remaining time by subtracting the T1 time from time for subjecting all pages of image data to image formation (a calculation method is the same as that for the estimated remaining time). Consequently, throughput is further improved.

By managing the printing mode with time as in the second embodiment, it is also possible to take into account a sheet size that is not managed with the number of pages in the first embodiment.

Processing by the color image forming apparatus 1 according to the second embodiment can be considered the same as the processing flow (see FIG. 6) of the function block according to the first embodiment. A processing flow of the color image forming apparatus 1 according to the second embodiment can be obtained by replacing the number of remaining job data S in FIG. 6 with the estimated remaining time, replacing the first predetermined number of pages X1 with the T1 time, replacing the second predetermined number of pages X2 with the T2 time, and replacing the determination in step S33 with the determination by the determining unit 72 according to the second embodiment (also replacing the steps S34-2, S34-3, and S34-4 with a determination result of the determining unit 72 according to the second embodiment).

As in the first embodiment, after calculating an initial value of the estimated remaining time (corresponding to step S31 in FIG. 6), the setting unit 73 may compare the initial value of the estimated remaining time and the T2 time before performing the next processing (corresponding to step S33 in FIG. 6). Consequently, the color image forming apparatus 1 can omit the determination processing of the determining unit 72 and the confirmation of a present printing mode (since the initial state of the printing mode is the color printing mode, the confirmation of a present printing mode can also be omitted) and further improve throughput.

The color image forming apparatus 1 according to the second embodiment includes the timer in the number-of-pages-of-image-formation acquiring unit 35. However, the timer may be arranged anywhere as long as the timer can perform data communication with the system main control unit 22.

As color image forming apparatuses and color image forming methods according to aspects of the present invention, color image forming apparatuses and color image forming methods described below can also be provided.

A color image forming apparatus according to an aspect of the present invention is a color image forming apparatus that has single-color-mode and color-mode switching means for automatically switching a printing mode between an single printing mode and a color printing mode according to image data, image formation of which is instructed, the color image forming apparatus including an image memory unit that stores the image data, number-of-pages-of-image-formation acquiring means for acquiring the number of pages of the image data printed, a first number-of-pages storing unit for storing the number of printed pages acquired by the number-of-pages-of-image-formation acquiring means, a second number-of-pages storing unit for storing the number of all pages of the image data, a third number-of-pages storing unit for storing the number of copies for operation switching determination set in advance, a comparing unit that compares the numbers of pages stored in the first to third number-of-pages storing unit and the number of copies for operation switching determination, and switching control means for controlling the single-color-mode and color-mode switching means to set an initial state of the printing mode at the start of a print jot in a color printing mode. The comparing unit compares the number of pages of the image data printed after the print job is started, which is stored in the first number-of-pages storing unit, and the number of copies for operation switching determination stored in the third number-of-pages storing unit. The switching control means maintains the color printing mode regardless of remaining image data until the number of printed pages exceeds the number of copies for operation switching determination.

A color image forming apparatus according to another aspect of the present invention is a color image forming apparatus that has single-color-mode and color-mode switching means for automatically switching, according to image data, image formation of which is instructed, a printing mode between a single color printing mode for performing image formation in a state in which a transfer member and a single image bearing member are set in contact with each other and a color printing mode for performing image formation in a state in which the transfer member and plural image bearing members are set in contact with each other, the color image forming apparatus including an image memory unit that stores the image data, number-of-pages-of-image-formation acquiring means for acquiring the number of pages of the image data printed, a first number-of-pages storing unit for storing the number of printed pages acquired by the number-of-pages-of-image-formation acquiring means, a second number-of-pages storing unit for storing the number of all pages of the image data, a third number-of-pages storing unit for storing the number of copies for operation switching determination set in advance, a comparing unit that compares the numbers of pages stored in the first to third number-of-pages storing units and the number of copies for operation switching determination, and switching control means for controlling the single-color-mode and color-mode switching means to set an initial state of the printing mode at the start of a print job in the color printing mode. The comparing unit compares the number of pages of the image data printed after the print job is started, which is stored in the first number-of-pages storing unit, and the number of copies for operation switching determination stored in the third number-of-pages storing unit. The switching control means maintains the color printing mode regardless of remaining image data until the number of printed pages exceeds the number of copies for operation switching determination.

The color image forming apparatus according to the aspect of the present invention further includes a fourth number-of-pages storing unit for storing another number of copies for operation switching determination set in advance and a fifth number-of-pages storing unit for storing the number of remaining pages of remaining image data of the print job. The comparing unit compares the number of printed pages of the image data printed after the print job is started, which is stored in the first number-of-pages storing unit, and the number of copies for operation switching determination stored in the third number-of-pages storing unit and compares the number of remaining pages of the remaining image data of the print job stored in the fifth number-of-pages storing unit and the another number of copies for operation switching determination stored in the fourth number-of-pages storing unit. The switching control means performs image formation in the color printing mode regardless of the remaining image data of the print job when the number of printed pages is equal to or larger than the number of copies for operation switching determination and the number of remaining pages is smaller than the another number of copies for operation switching determination.

The color image forming apparatus according to the aspect of the present invention further includes a fourth number-of-pages storing unit for storing another number of copies for operation switching determination set in advance and a fifth number-of-pages storing unit for storing the number of remaining pages of remaining image data of the print job. The comparing unit compares the number of printed pages of the image data printed after the print job is started, which is stored in the first number-of-pages storing unit, and the number of copies for operation switching determination stored in the third number-of-pages storing unit and compares the number of remaining pages of the remaining image data of the print job stored in the fifth number-of-pages storing unit and the another number of copies for operation switching determination stored in the fourth number-of-pages storing unit. The switching control means controls, when the number of printed pages is equal to or larger than the number of copies for operation switching determination and the number of remaining pages is equal to or larger than another number of copies for operation switching determination, the single-color-mode and color-mode switching means on the basis of information concerning whether the image data stored in the image memory unit include only a single color or colors in a unit of the another number of copies for operation switching determination and performs image formation while maintaining the printing mode in a unit of the another number of copies for operation switching determination.

In the color image forming apparatus according to the aspect of the present invention, the switching control means further performs image formation in the color printing mode when the number of remaining pages of the image data obtained by subtracting the another number of copies for operation switching determination from the number of remaining pages is smaller than the another number of copies for operation switching determination and the remaining image data of the print job includes color image data.

In the color image forming apparatus according to the aspect of the present invention, the switching control means further performs image formation in the single color printing mode when the number of remaining pages of the image data obtained by subtracting the another number of copies for operation switching determination from the number of remaining pages is smaller than the another number of copies for operation switching determination and all the remaining image data of the print job are single color image data.

In the color image forming apparatus according to the aspect of the present invention, the number of copies for operation switching determination stored in the third number-of-pages storing unit can be changed.

In the color image forming apparatus according to the aspect of the present invention, the another number of copies for operation switching determination stored in the fourth number-of-pages storing unit can be changed.

A color image forming method according to still another aspect of the present invention is a color image forming method of automatically switching between a single color printing mode and a color printing mode according to requested image data, the color image forming method including starting, when capturing of image data of a print job is started, storage of the image data in an image memory unit, starting image formation of the image data in a color printing mode as an initial state, comparing the number of printed pages of the image data printed and the number of copies for operation switching determination, and maintaining the color printing mode regardless of the image data until the number of printed pages reaches the number of copies for operation switching determination.

A color image forming method according to still another aspect of the present invention is a color image forming method of automatically switching, according to requested image data, a printing mode between a single color printing mode for performing image formation in a state in which a transfer member and a single image bearing member are set in contact with each other and a color printing mode for performing image formation in a state in which the transfer member and plural image bearing members are set in contact with each other, the color image forming method including starting, when capturing of image data of a print job is started, storage of the image data in an image memory unit, starting image formation of the image data in a color printing mode as an initial state, comparing the number of printed pages of the image data printed and the number of copies for operation switching determination, and maintaining the color printing mode regardless of the image data until the number of printed pages reaches the number of copies for operation switching determination.

The color image forming method according to the aspect of the invention further includes determining, until the number of printed pages reaches the number of copies for operation switching determination, whether at least the number of remaining pages of the remainder of the image data is equal to or larger than another number of copies for operation switching determination, completing the image formation while maintaining the color printing mode when the number of remaining pages is smaller than the number of copies for operation switching determination, determining whether the remaining image data include only a single color or colors in a unit of the another number of copies for operation switching determination when the number of remaining pages is equal to or larger than the another number of copies for operation switching determination, and controlling the single color printing mode and the color printing mode on the basis of a result of the determination and performing image formation in a unit of the another number of copies for operation switching determination.

The color image forming method according to the aspect of the invention further includes determining the number of remaining pages of the remainder of the image data obtained by subtracting the another number of copies for operation switching determination from the number of remaining pages is equal to or larger than the another number of copies for operation switching determination, repeating the determination on whether the image data include only a single color or colors in a unit of the another number of copies for operation switching determination until the number of remaining pages decreases to be smaller than the another number of copies for operation switching determination when the number of remaining pages is equal to or larger than the another number of copies for operation switching determination, determining whether the image data include only a single color or colors when the number of remaining pages is smaller than the another number of copies for operation switching determination, and controlling the single color printing mode and the color printing mode on the basis of a result of the determination and a present printing mode and completing the image formation.

The color image forming method according to the aspect of the invention further includes determining, at a stage when the number of printed pages reaches the number of copies for operation switching determination, whether the number of remaining pages of the remainder of the image data is equal to or larger than the another number of copies for operation switching determination, completing the image formation while maintaining the color printing mode when the number of remaining pages is smaller than the another number of copies for operation switching determination, determining whether the remaining image data include only a single color or colors in a unit of the another number of copies for operation switching determination when the number of remaining pages is equal to or larger than the another number of copies for operation switching determination, controlling the single color printing mode and the color printing mode on the basis of a result of the determination, and performing image formation in a unit of another number of copies for operation switching determination.

The color image forming method according to the aspect of the invention further includes determining the number of remaining pages of the remainder of the image data obtained by subtracting the another number of copies for operation switching determination from the number of remaining pages is equal to or larger than the another number of copies for operation switching determination, repeating the determination on whether the image data include only a single color or colors in a unit of the another number of copies for operation switching determination until the number of remaining pages decreases to be smaller than the another number of copies for operation switching determination when the number of remaining pages is equal to or larger than the another number of copies for operation switching determination, determining whether the image data include only a single color or colors when the number of remaining pages is smaller than the another number of copies for operation switching determination, and controlling the single color printing mode and the color printing mode on the basis of a result of the determination and a present printing mode and completing the image formation.

The present invention is not limited to the embodiments and may be modified and embodied in various forms without departing from the gist of the present invention.

The present invention has been explained in detail according to the specific forms. However, it would be obvious for those skilled in the art that various changes and alterations can be made without departing from the spirit and the scope of the present invention.

As described above in detail, according to the present invention, it is possible to secure throughput of a print job and suppress wear of process units.

What is claimed is:

1. A color image forming apparatus that has mode switching means for switching, on the basis of image data, image formation of which is instructed, a printing mode between a single color printing mode for performing image formation in a state in which a transfer member and a single image bearing member are set in contact with each other and a color printing mode for performing image formation in a state in which the transfer member and plural image bearing members including the single image bearing member are set in contact with each other, the color image forming apparatus comprising:

a calculating unit configured to calculate, on the basis of a number of pages subjected to image formation in the image data, a number of remaining pages not subjected to image formation yet and a sheet size of image data not subjected to image formation yet, and calculate, on the basis of the number of remaining pages and the sheet size, an estimated remaining time until completion of image formation of the image data;

a setting unit configured to set, on the basis of at least the estimated remaining time, the printing mode in the single color printing mode or the color printing mode; and a control unit configured to control, when image formation of the image data is performed, the mode switching means to always perform image formation in the color printing mode from the start of driving of an image bearing member that comes into contact with the transfer member in both the single color printing mode and the color printing mode until a first time, which is a predetermined time, elapses, and control the mode switching means to perform image formation in the printing mode set by the setting unit at each interval of a second time, which is a predetermined time after the elapse of the first time.

2. A color image forming apparatus according to claim 1, wherein the setting unit sets the printing mode in the color printing mode when the estimated remaining time is shorter than the second time and a present printing mode is the color printing mode.

3. A color image forming apparatus according to claim 1, further comprising a determining unit configured to determine whether there is a color image in image data for a number of pages subjected to image formation in the second time from a top page in the image data of the number of remaining pages, wherein the setting unit sets the printing mode in the color printing mode when the estimated remaining time is equal to or longer than the second time and it is determined by the determining unit that there is a color image.

4. A color image forming apparatus according to claim 1, further comprising a determining unit configured to determine whether there is a color image in image data for a number of pages subjected to image formation in the second time from a top page in the image data of the number of remaining pages, wherein the setting unit sets the printing mode in the single color printing mode when the estimated remaining time is equal to or longer than the second time and it is determined by the determining unit that there is no color image.

5. A color image forming apparatus according to claim 1, further comprising a determining unit configured to determine whether there is a color image in image data for a number of pages subjected to image formation in the second time from a top page in the image data of the number of remaining pages, wherein when the estimated remaining time is shorter than the second time and a present printing mode is the single color printing mode, the setting unit sets the printing mode in the color printing mode when it is determined by the determining unit that there is a color image and sets the printing mode in the single color mode when it is determined by the determining unit that there is no color image.

6. A color image forming apparatus according to claim 1, wherein the calculating unit sets an initial value of the estimated remaining time by subtracting the first time from time for subjecting all pages of the image data of image formation until the first time elapses from the start of driving of an image bearing member that comes into contact with the transfer member in both the single color printing mode and the color printing mode.

* * * * *